United States Patent
Kreiner et al.

(10) Patent No.: US 8,904,184 B2
(45) Date of Patent: Dec. 2, 2014

(54) CERTIFICATION OF AUTHENTICITY OF MEDIA SIGNALS

(75) Inventors: Barrett Kreiner, Woodstock, GA (US); Jonathan Reeves, Roswell, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1115 days.

(21) Appl. No.: 12/332,209

(22) Filed: Dec. 10, 2008

(65) Prior Publication Data
US 2010/0146287 A1    Jun. 10, 2010

(51) Int. Cl.
*H04L 29/06* (2006.01)
*H04L 9/32* (2006.01)

(52) U.S. Cl.
CPC ............ *H04L 9/3297* (2013.01); *H04L 63/12* (2013.01); *H04L 9/3247* (2013.01); *H04L 2209/60* (2013.01)
USPC ........... 713/178; 713/155; 713/156; 713/168; 380/200

(58) Field of Classification Search
CPC ..... H04L 63/12; H04L 9/3247; H04L 9/3297; H04L 2209/60; G06F 21/10; G06F 21/60
USPC ................... 713/155, 156, 168, 178; 380/200
See application file for complete search history.

(56) References Cited

U.S. PATENT DOCUMENTS

| | | | | |
|---|---|---|---|---|
| 5,912,972 A * | 6/1999 | Barton | ........................... | 713/176 |
| 6,804,356 B1 * | 10/2004 | Krishnamachari | ........... | 380/201 |
| 7,120,252 B1 * | 10/2006 | Jones et al. | .................... | 380/201 |
| 7,194,636 B2 * | 3/2007 | Harrison | ....................... | 713/193 |
| 7,593,850 B2 * | 9/2009 | Berg et al. | ...................... | 704/226 |
| 8,467,567 B2 * | 6/2013 | Pan et al. | ....................... | 382/100 |
| 2002/0188945 A1 * | 12/2002 | McGee et al. | ................... | 725/39 |
| 2004/0153648 A1 * | 8/2004 | Rotholtz et al. | .............. | 713/176 |
| 2005/0257067 A1 * | 11/2005 | Roberts | .......................... | 713/186 |
| 2006/0195886 A1 * | 8/2006 | Ashley | ........................... | 725/138 |
| 2007/0074035 A1 * | 3/2007 | Scanlon et al. | ............... | 713/176 |
| 2007/0098172 A1 * | 5/2007 | Levy et al. | ..................... | 380/247 |
| 2008/0037783 A1 * | 2/2008 | Kim et al. | ...................... | 380/241 |
| 2009/0055651 A1 * | 2/2009 | Girod et al. | .................... | 713/176 |
| 2009/0165031 A1 * | 6/2009 | Li et al. | ............................ | 725/22 |
| 2010/0100737 A1 * | 4/2010 | Chapman | ...................... | 713/168 |
| 2010/0281545 A1 * | 11/2010 | Levy | ................................ | 726/30 |
| 2010/0302450 A1 * | 12/2010 | Farkash | ........................ | 348/699 |
| 2011/0122945 A1 * | 5/2011 | Li et al. | ..................... | 375/240.12 |
| 2011/0261996 A1 * | 10/2011 | Keidar et al. | .................. | 382/100 |

OTHER PUBLICATIONS

Digital Signature, Wikipedia, the free encyclopedia, http://en.wikipedia.org/wiki/Digital_signature, last modified Nov. 10, 2008.

* cited by examiner

*Primary Examiner* — Christopher Revak
*Assistant Examiner* — Sarah Su
(74) *Attorney, Agent, or Firm* — Guntin & Gust, PLC; Joseph Hrutka

(57) ABSTRACT

Media signals such as audio and/or video signals are certified as being authentic. A private key and a corresponding public key are provided. For a current media segment of the media signal, a signature is created using the private key to sign data based on media content of the current media segment combined with a signature from a media segment present at another point within the media signal where the signature from the media segment present at another point within the media signal is created by signing with the private key data based on media content of the media segment present at the other point within the media signal. The signature is included in metadata of the current media segment of the media signal and the public key is included in a second metadata of the media signal.

17 Claims, 6 Drawing Sheets

CERTIFICATION OF AUTHENTICITY OF MEDIA SIGNALS

TECHNICAL FIELD

Embodiments are related to the authenticity of media signals. More particularly, embodiments are related to certifying that media signals are authentic.

BACKGROUND

Media signals such as video signals, audio signals, and/or audio-video signals, whether in a digital form or an analog form, may be presented in a context where the authenticity of such media signals is put into dispute. For instance, audio-video signals may be captured that appear to show a supernatural phenomenon, an unidentified flying object, and the like. As another example, audio-video signals may be offered as evidence in a court of law or in other proceedings to prove that what is shown on the video signals actually happened.

With the prominence of editing tools, media signals may be edited to present false information. For instance, a media signal carrying audio may have some portions of the audio removed or additional audio added. As another example, a media signal carrying video may have objects inserted in or removed from one or more video frames and frames may be added or deleted. Such editing may be done at a level of proficiency that makes detecting such alterations from merely viewing the content very difficult if not impossible. Thus, the reliability of media signals is subject to scrutiny because of the possibility of editing.

In a court of law, the chain of custody of the storage medium containing the media signal may have to be shown to achieve some level of confidence that the media signal is authentic. Even where the chain of custody is adequately proven to be acceptable, there may still be doubts as to whether someone within the chain of custody has modified the media signals to suit a particular purpose.

Some attempts have been made to provide embedded information into a media signal to show its authenticity. For example, audio and/or video watermarks may be embedded to alter the audio and/or video content to some degree that is perceivable by the viewer. However, such artifacts within the media signals may compromise the content that is of interest in a given situation, and such watermarks may be reproducible. Furthermore, watermarks may not account for some types of editing that may occur.

SUMMARY

Embodiments address issues such as these and others by providing a certification that media signals are authentic. Media segments of media signals, such as video frames or designated blocks of audio, may be digitally signed in metadata of the media segment. The signature may be based on the media content of the frame as well as based on a signature of one or more other media segments of the media signal. Thus, manipulation of media content of any media segment becomes detectable when attempting to verify the signature of a media segment during playback. Thus, during playback, the media signal and/or portions thereof may be identified as being certified or uncertified with respect to authenticity.

Embodiments include a method of establishing certification of contents of a media signal. The method involves providing private key and a corresponding public key. For a current media segment of the media signal, the method further involves creating a signature using the private key to sign data that is based on media content of the current media segment combined with a signature from a media segment present at another point within the media signal. The signature from the media segment present at another point itself is created by signing with the private key data based on media content of that media segment that is present at the other point. The method further involves including the signature of the current media segment in metadata of the current media segment of the media signal and including the public key in metadata of the media signal.

Embodiments provide a computer readable medium containing instructions that when implemented result in acts that include providing private key and a corresponding public key. For a current media segment of a media signal, the acts further include creating a signature using the private key to sign data based on media content of the current media segment combined with a signature from a media segment present at another point within the media signal. The signature from the media segment present at another point is created by signing with the private key data based on media content of the media segment present at another point. The acts further include including the signature in metadata of the current media segment of the media signal and including the public key in metadata of the media signal.

Embodiments provide a device for establishing certification of contents of a media signal. The device includes operating memory including a private key and a corresponding public key. The device also includes a processor that, for a current media segment of the media signal, creates a signature using the private key to sign data based on media content of the current media segment combined with a signature from a media segment present at another point within the media signal. The signature from the media segment present at another point is created by signing with the private key data based on media content of the media segment present at another point. The processor also includes the signature in metadata of the current media segment of the media signal and includes the public key in metadata of the media signal.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Embodiments provide for the inclusion of digital signatures within the metadata of individual media segments of a media signal. The digital signature of a media segment is based upon media content present within that media segment as well as from signatures created for other media segments of the media signal. Other information may also be included in the signature. Accordingly, if either the media content of the present media segment or the signature of other media segments has been altered, then during playback the signature for the present media segment will not verify such that an indicator of no certification for the present media segment may be provided. If the content revealed during verification of the signature for the media segment has not been altered, then the signature will verify such that an indicator of certification for the present media segment may be provided.

Figure 1:
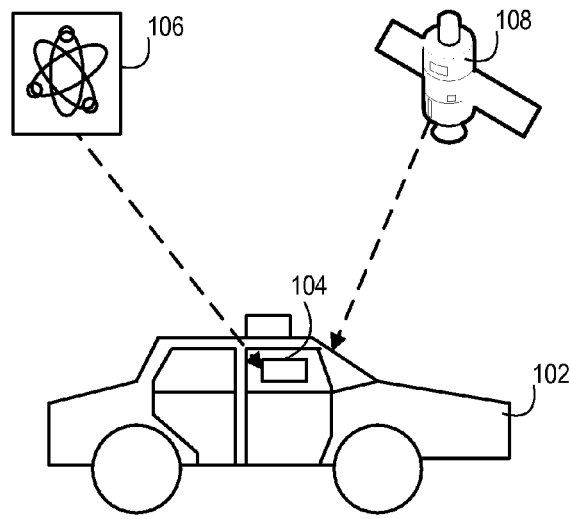
FIG. 1 shows one example of an environment where certified media signals may be captured according to various illustrative embodiments.

FIG. 1 shows an example of an environment where media signals may be captured and where certification of the authenticity of those media signals may be desired. In this example, a police car 102 includes an on-board camera 104 that records footage outside of the vehicle 102. For example, the camera 104 may record audio-video signals during a car chase, during a traffic stop, and the like. The footage being captured may later be used as evidence to assist in proving what actions took place.

The camera 104 may apply a certification process whereby signatures are added to the metadata of the data segments of the media signals being captured, which in this case are the frames of the audio-video signals. The signature for a given frame is based upon the audio and/or video content of the frame as well as one or more signatures of other frames where those signatures are based on media content of the corresponding frames and signatures of yet another collection of frames. Thus, the frames are linked together by the signature of one frame being included in the data signed for another frame. Thus, there is a continuity of certification established among the frames which is discussed in more detail below.

The signature for a given frame may also be based on additional data, such as situationally variable data that is captured as additional pertinent information for the footage. For instance, the time at which each frame of audio-video is being captured may become a time stamp that is included in the metadata and in the data being signed for that frame. This time may come from various sources such as an atomic clock 106 that distributes the current time via radio waves that are received by the camera 104 and this time may be relevant to the footage. As another example, the camera 104 may also receive signals from geonavigational satellites 108 that allow geographical coordinates of the camera 104 to be derived and included in the meta data and in the data being signed for that frame. These geographical coordinates may also be relevant to the footage. It may be desirable to confirm that such metadata information is authentic when considering the overall authenticity of the media segment.

Figure 2:
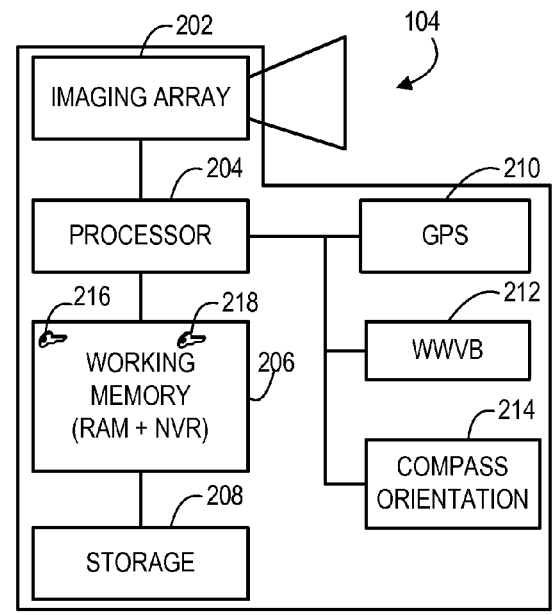
FIG. 2 shows an example of a media signal recording device according to various illustrative embodiments.

FIG. 2 shows one example of a media signal capture device, such as the camera 104 of FIG. 1, which adds certification metadata to the media segments of the media signal being captured. In this particular example, video signals are being captured via an imaging array 202. The imaging array provides the image data on a frame by frame basis to a processor 204 where each frame can be placed into a working memory 206 for further processing as desired and then stored in a long term storage device 208. The working memory 206 may include both random access memory and non-volatile memory, while the storage device 208 may be of various forms such as electronic, magnetic, and/or optical storage.

The processor 204 may add the certification data to the metadata of each frame including the digital signature as well as additional information that may be relevant to verifying the digital signature. The processor 204 may collect media content information from the media content, such as by collecting the first or last X number of bits of audio and/or video data, collecting X number of bits occurring at certain scattered bit positions for the audio and/or video data, or computing a checksum of a collection of some number of bits of the audio and/or video data. This media content information may then be combined, for example by concatenation, with other information including signatures of other frames that have already been computed.

In some embodiments, the combination of only the media content information and the one or more signatures of other frames are then signed using a private key 218 of a private/public key pair stored in the working memory 206. The public key 216 is included within metadata of the audio-video signal such as within the metadata of each frame so that it is readily available during playback for purposes of verifying the signature of each frame.

In some embodiments, the public key may be wrapped in a certificate, such as one issued by a trusted source, to identify whether the public key corresponds to the expected certifying device such as the camera that captured the footage. In this manner, should an attempt occur to maliciously replace the entire collection of signatures or some lengthy subset of them with bogus ones, the public key for the bogus signatures will not match the public key for the expected certifying device and certification can be denied for the media on that basis. So a first test of certification may be to compare credentials of the public key presented by the media to those that are expected and when they do not match then certification can be denied.

Other techniques may also be used to prevent malicious replacement of the entire collection of signatures or some lengthy subset of them. For instance, the location of the signature from one frame to the next within the metadata of the media may be randomized using an algorithm by the certifying device that is also known only by the playback device. Thus, the signatures cannot easily be replaced from one frame to the next because the location of the signatures varies in a way that is unknown to malicious individuals.

If the media content itself has been manipulated, then the signature that has been created will not verify. Also, if the signature of the one or more other frames has been manipulated such as in an attempt to modify the content of the one or more other frames and create a new signature for those modified frames to try to subvert the certification process, then the signature of the present frame will not verify. Thus, even in the highly unlikely event that a maliciously created new signature for a nearby frame with modified content would verify, then the failure of the present frame to verify based on the failure to match the signature of the nearby frame will call into question the authenticity of the nearby frame.

In other embodiments, additional information may be combined with the media content information and the one or more signatures of other frames and then signing that combination using the private key 218. For instance, to prevent a malicious attempt at creating new signatures by using a new private/public key pair, the public key 216 used to create the original signature for a frame may be included in the data being signed with the original private key 218. Thus, the public key 216 of signature would not match the public key of the metadata necessary to verify the maliciously created signature such that the signature would not verify. As a result, the frame would not be certified by the playback device.

As discussed above, the camera 104 may receive GPS signals, via a GPS receiver 210 which provides the geographical coordinates to the processor 204 where they may be added to the metadata of each frame to give the media content a reliable geographical position. The geographical coordinates may also be included in the data being signed with the private key 218 so that tampering with the geographical coordinates within the metadata may result in a failure to verify the signature of a frame. As a result, the frame would not be certified by the playback device.

Likewise, an atomic clock receiver, such as a WWVB receiver 212, may be included to obtain a reliable time stamp that is provided to the processor 204. This time stamp may then be added to the metadata of each frame of the media signal to give the media content a reliable time reference. This time stamp may also be included in the data being signed with the private key 218 so that tampering with the time stamp within the metadata may result in a failure to verify the signature of a frame. As a result, the frame would not be certified by the playback device.

Additionally, information about the angle and position of the camera 104 may be relevant to the footage and may be captured by a compass and orientation sensor 214. This angle and position data may then be added to the metadata of each frame of the media signal to give the media content a reliable angle and position of capture. This angle and position data may also be included in the data being signed with the private key 218 so that tampering with the angle and position data within the metadata may result in a failure to verify the signature of a frame. As a result, the frame would not be certified by the playback device.

Figure 3:
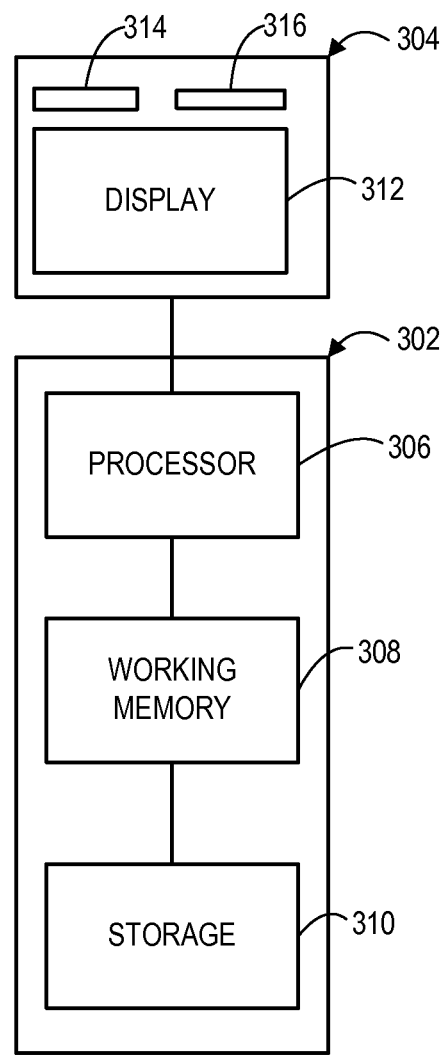
FIG. 3 shows an example of a media signal playback device according to various illustrative embodiments.

FIG. 3 shows an example of a playback device 302 and related output device 304 used to playback the media signals that include the certification data. The playback device 302 may include a processor 306 that communicates with a working memory 308 and a long term storage device 310. A media signal recording on the long term storage device 310 may be read into the working memory 308. The processor 306 then analyzes each media segment of the media signals to attempt to verify the signature of each media segment.

The processor 306 may provide the media signals including each media segment to the output device 304 regardless of whether the signatures for each media segment verify or not. However, the processor 306 may provide an indicator signal that shows that a given media segment is certified when the signature for the media segment was verified whereas the processor 306 may provide an indicator signal that shows that a given media segment is not certified when the signature for the media segment was not verified.

In this example, the output device 304 includes a media output portion 312, such as a display screen and/or speakers for outputting video and/or audio content. This output device 304 may also include the capability of activating indicators, such as indicators 314 and 316. The indicators 314, 316 may light up when signaled by the processor 306. For instance, indicator 314 may light up when the media segment being output is certified, while indicator 316 may light up when the media segment being output is not certified. These indicators may be of a variety of forms. For instance, the indicators that the media segment is certified or not may be messages displayed on a display screen, including the display screen 312 being used to display the media segment in question. Furthermore, the indicator of no certification may indicate the specific reason(s) for no certification, such as modified media content versus a modified signature of a nearby frame.

Figure 4:
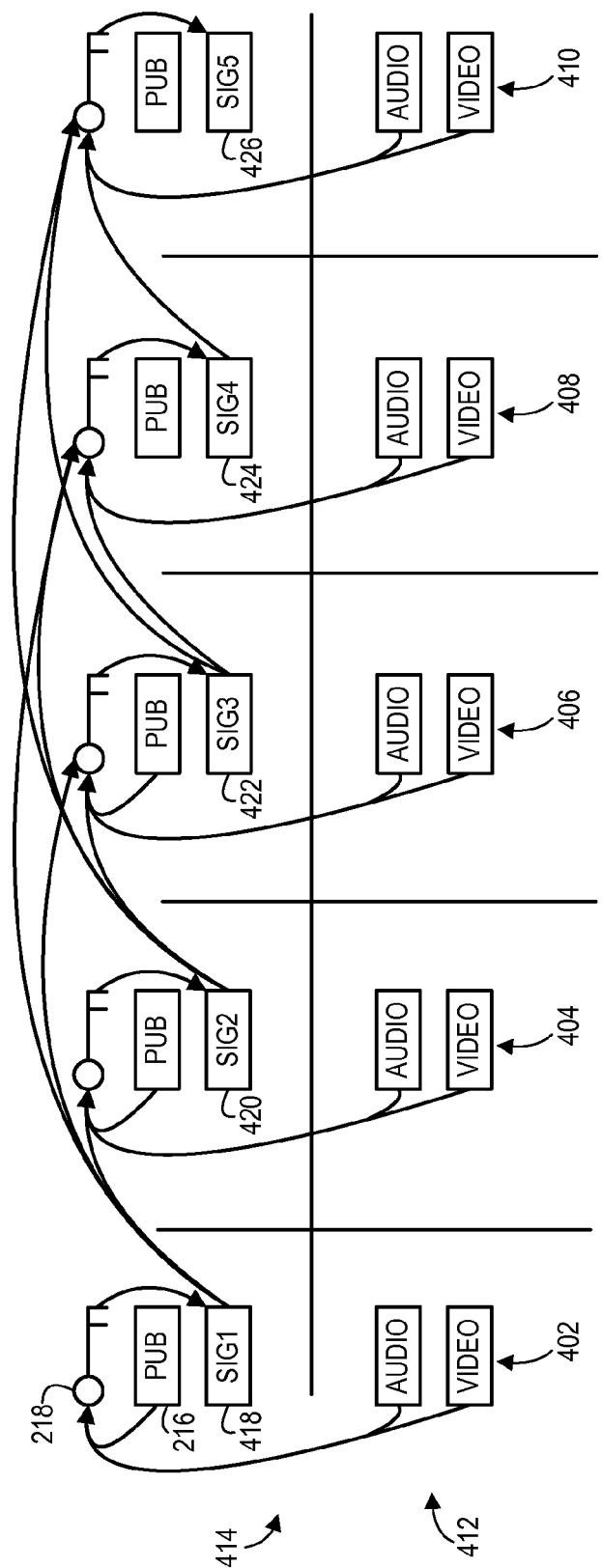
FIG. 4 shows contents of an example of a media signal according to various illustrative embodiments.

FIG. 4 shows an example of a series of media segments starting at a first media segment 402 of a media signal and also shows the certification data that is being added to each one. The media segment 402 includes a metadata portion 414 and also includes a media content portion 412. Here, the collection of audio data and/or video data is present. The content that is desired to be in the signature corresponding to the media segment 402 is signed using the private key 218. In the example shown, media content information, such as specific bits or a checksum, are combined with at least the public key 216 and are signed with the private key 218. This produces a first signature (SIG 1) 418.

The content that is desired to be in the signature corresponding to the media segment 404 is combined. In this example, the content includes the media content information from the media segment 404 in combination with at least (SIG 1) 418 and the public key 216. This combination is signed using the private key 218 to produce a second signature (SIG 2) 420. Since the playback device can obtain the public key from verifying the (SIG 1) 418 and then re-use it for each media segment, then the pubic key 216 may be omitted from subsequent signatures and/or may be omitted from the metadata 414 of subsequent frames if desired.

The content that is desired to be in the signature corresponding to the media segment 406 is combined. In this example, the content includes the media content information from the media segment 406 in combination with at least (SIG 1) 418, (SIG 2) 420, and the public key 216. This combination is signed using the private key 218 to produce a third signature (SIG 3) 422.

The content that is desired to be in the signature corresponding to the media segment 408 is combined. In this example, the content includes the media content information from the media segment 408 in combination with at least (SIG 1) 418, (SIG 2) 420, and (SIG 3) 422. This combination is signed using the private key 218 to produce a fourth signature (SIG 4) 424. It will be noted that the public key has been replaced by a signature now that three signatures of previous media segments are available to include in the data to be signed.

The content that is desired to be in the signature corresponding to the media segment 410 is combined. In this example, the content includes the media content information from the media segment 410 in combination with at least (SIG 2) 420, (SIG 3) 422, and (SIG 4) 424. This combination is signed using the private key 218 to produce a fifth signature (SIG 5) 426. It will be noted that (SIG 1) 418 has been replaced by the advancement of (SIG 2) 420, (SIG 3) 422, and the introduction of (SIG 4) 424.

By maintaining a certain number of signatures corresponding to a set of previous media segments in the content to be signed for a given media segment, a sliding window of previous media segments is established. At the media segment 410, the window includes the signatures corresponding to the media segments 404, 406, and 408. This sliding window allows the certification process to detect a media signal that has been time edited by dropping original segments. In that case, the signature of a previous frame that is obtained by verifying the signature of the current frame will cause the signature of the current frame not to verify.

Thus, in the example shown in FIG. 4, if any of segments 404, 406, or 408 are dropped, then the (SIG 5) 426 will not verify. This occurs because the signature of the dropped segment(s) 404, 406, or 408 is not present at the playback device and a signature of other preceding segments such as (SIG 1)

418 of the segment 402 would be considered when attempting the verification. Since (SIG 1) 418 was not included in the data signed to produce (SIG 5) 426, the verification of (SIG 5) 426 will fail.

In the case of a failed verification due to the occurrence of a missing media segment, an indication of no certification may be provided when playing back the current media segment such as the segment 410. With this specific knowledge about a missing media segment, the indication itself may be specific in that it indicates no certification due to a missing media segment.

Other specific knowledge may also result in other specific indicators as noted above in relation to FIG. 3. For example, and indicator may specify no certification due to modification of the media content, due to modification of a signature of a nearby media segment, due to modification of the public key, and so forth.

The sliding window built into each signature also provides the ability to begin determining whether to certify frames at virtually any point in the media signal time span, including after drop outs which may occur in a streaming environment. The verification of a signature of a current frame needs to look back only a relatively small number of media segments rather than looking all the way back to the beginning media segment. Thus, the certification during playback can begin again once an adequate number of media segments are received. For instance, as shown in FIG. 4, if the first media segment 402 is dropped, the fifth media segment 410 can still be certified because (SIG 5) 426 is not based upon (SIG 1) 418 and can still be verified.

Additionally, the playback device may offer various degrees of certification on the basis of whether dropouts in the certification of each frame have occurred. So, for instance, if the playback device is offering a highest certification, then certification may be denied for the entire stream once certification has been lost for any frame. If the playback device is offering a very high certification, then perhaps those frames occurring after the dropout are denied certification. If the playback device is offering a normal certification, then perhaps those frames occurring after the dropout during a given time period of signatures validating again are denied certification.

The media segments shown in FIG. 4 may represent individual frames of audio, video, or audio-video. Furthermore, the individual frames may be of a digital media signal or an analog video signal. In the context of a digital media signal, each data segment as shown in FIG. 4 is a data structure and may be stored and transmitted between devices as the data structure. In the context of an analog media signal, each data segment as shown in FIG. 4 may represent an analog frame where there are analog signals having time varying amplitudes to represent the media content. The time varying signals may be sampled to produce data that is included in the dataset to sign. Furthermore, the metadata including the signature for the data segment may be represented by time varying signals occurring during an overscan time period of the analog video frame.

Figure 5:
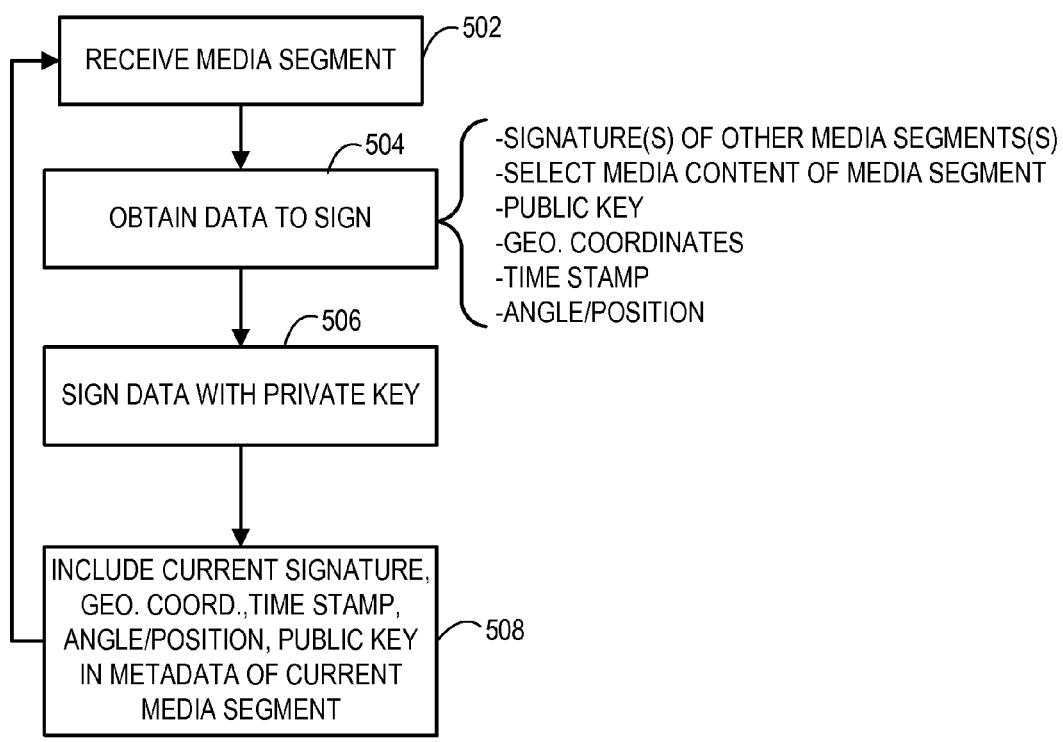
FIG. 5 shows an example of logical operations performed to provide certification data to a media signal according to various illustrative embodiments.

FIG. 5 shows one example of a set of logical operations that may be performed to add certification data to a media signal. These logical operations may be performed during the initial media capture and storage, such as within the camera or other recorder creating the media signal. In that case, the media signal may be considered certified dating back to its initial creation. As another example, these logical operations may be performed at some later time by accessing the already stored media signal and adding the certification data at that time. In that case, the media signal may be considered certified data back to the time that the certification data was added which is after the initial creation.

The logical operations begin at a reception operation 502 where the device that is adding the certification data, such as the processor 204, receives a given media segment of the media signal. The processor 204 then obtains all of the data that will be signed to produce the signature for this media segment at a collection operation 504. As discussed above, there may be a variety of information types to include.

As shown in FIG. 4, the signatures that have already been created for one or more other media segments are included in the data to be signed to tie together the certification of the present media segment to the certification of other nearby media segments. Considering that the media segments are aligned in time, the media segments that are encountered earlier during playback may be chosen to use their signatures in the data to be signed for the present frame so that the processor 204 need not read ahead of the current media segment when creating the signature and so that the processor 306 need not read ahead of the current media segment when attempting to verify the signature.

In addition to the signatures of other media segments, select media content may also be included in the data to be signed. As discussed above, the first X bits, the last X bits, scattered bits, and so forth may be selected for inclusion. So long as the playback processor 306 knows the scheme that was used to select the media content, the processor 306 can thus compare what media content is present in a media segment to what media content should be present as is revealed during the verification of the signature.

The public key 218, geographical coordinates, time stamp, and the angle/position information that has been discussed above may also be included in the data to be signed. Thus, this information allows the processor 306 to check the public key, geographical coordinates, time stamp, and angle/position data being presented in the metadata of a media segment against the public key, geographical coordinates, time stamp, and angle/position that should be present as is revealed during the verification of the signature.

The collection of the data may be combined in various ways as noted above. For instance, the data may simply be concatenated. Furthermore, the data may be hashed or otherwise manipulated prior to being signed. So long as the processor 306 has the awareness to reverse the manipulation once the data is revealed from the signature by application of the public key 216, verification of the signature and hence the certification of the media segment can be done.

Once the dataset to be signed is prepared, the processor 204 then signs the data with a signing algorithm in conjunction with the private key 218 at a signature operation 506. Signing the data results in a signature that can be verified by the processor 306 applying the public key 218 with a verification algorithm.

The certification data can be completed for the current media segment by including the current signature that has just been created in the metadata for the current media segment at a metadata operation 508. Any other pertinent data that was included in the data being signed to create the signature, besides the actual media content data, that is not already present in the metadata may also be included. The geographical coordinates, the time stamp, and the angle/position may have already been included in the metadata as the media segment was being created. The public key may also be included in the metadata for the current media segment. The media segment is now ready for long term storage, and operational flow proceeds to the next media segment.

The logical operations of FIG. 5 may also be used to certify and edit an already certified media signal. For instance, there may be a valid reason to edit the original media signal, such as to blur someone's face to protect their identity at some time after the media signal has already been certified. Certification of the edited version may be desired. In that case, the device adding the certification may replace the existing signatures with new signatures that are based on the modified media content. A requirement may be to first confirm that the video being edited is itself certified prior to replacing the existing signatures with new signatures as a part of the editing process. Another approach is to wrap the existing signatures into the new signatures, where the new data (i.e., the data to be hashed/computed and signed since the last signature, as well as the last signature(s) itself) are included in the next block of data to be signed.

Figure 6:
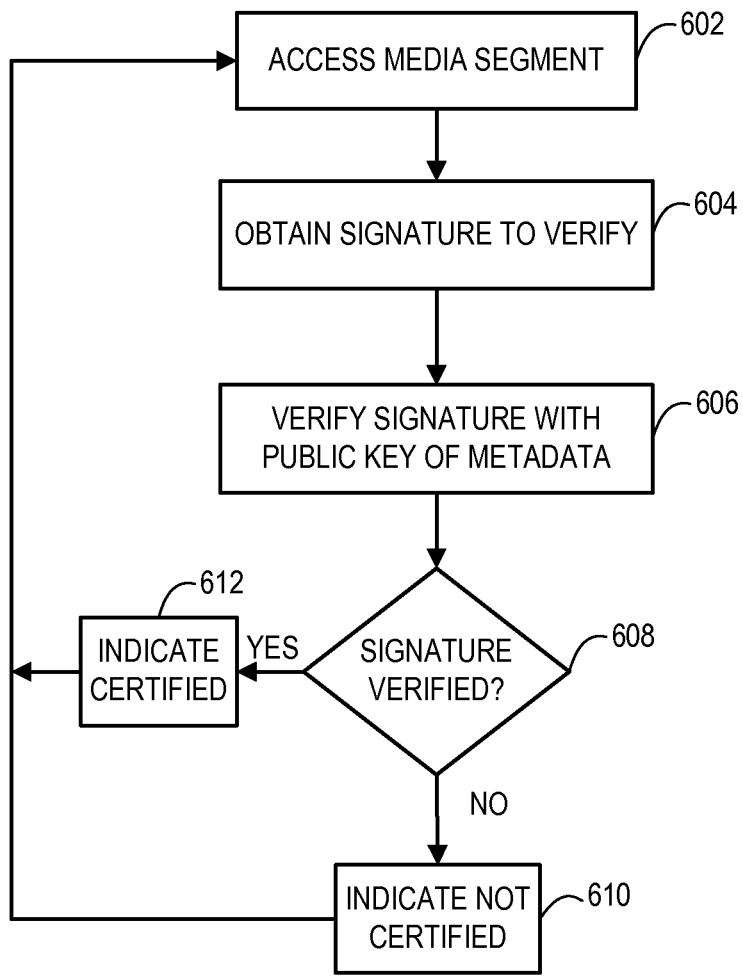
FIG. 6 shows an example of logical operations performed to provide an indication of whether the media signal being played back is certified as authentic according to various illustrative embodiments.

FIG. 6 shows an example of logical operations that may be performed by a device, such as the processor 306, during playback in order to determine whether a given media segment of a media signal is certified. At an access operation 602, during playback of the media signal the processor 306 accesses the next media segment of the sequence. The processor 306 then obtains the signature from the metadata of the media segment so that it can be verified at a signature operation 604. At a verification operation 606, the processor 306 applies the verification algorithm in conjunction with the public key 216 to the signature.

Figure 7:
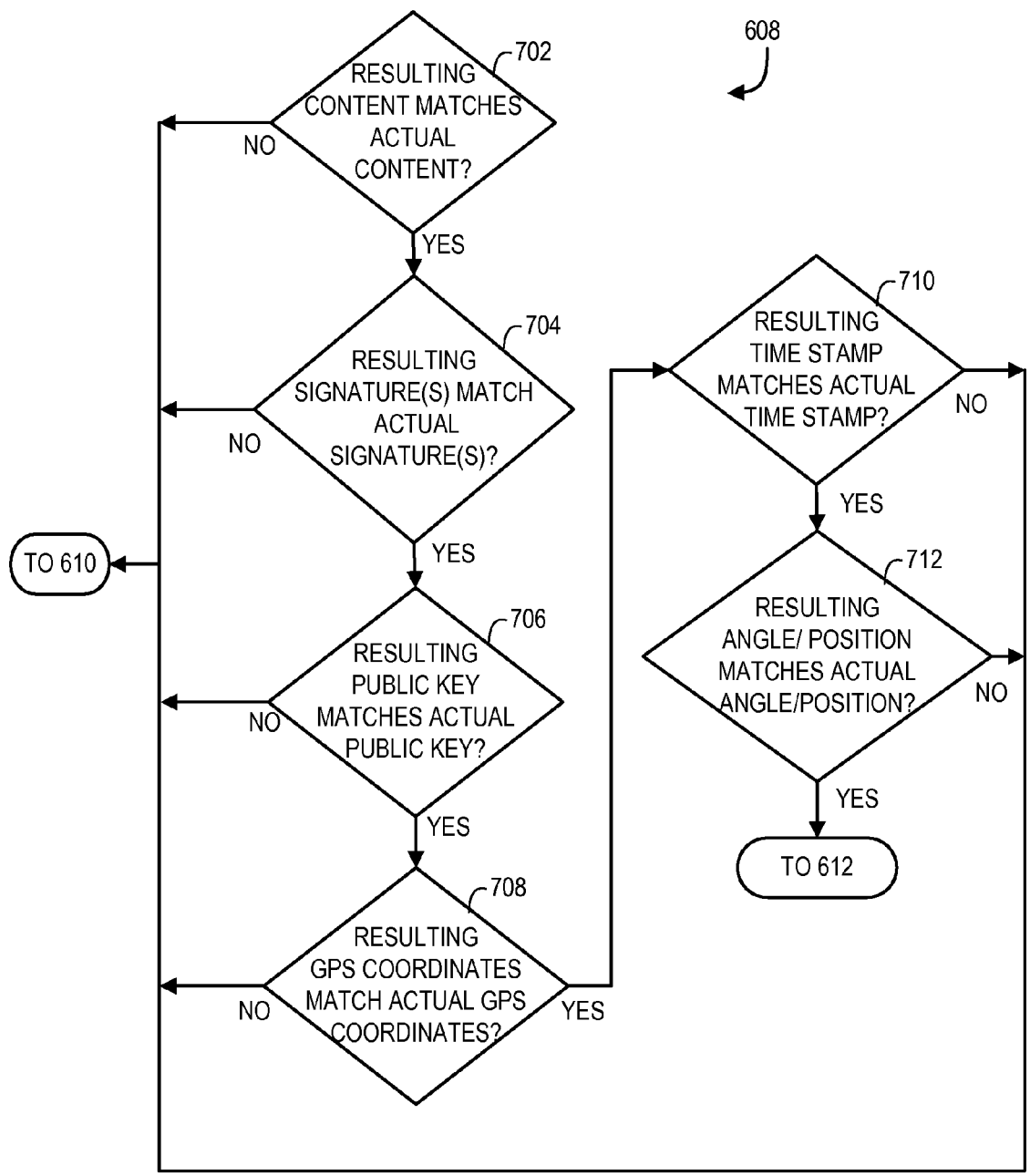
FIG. 7 shows an example of additional logical operations performed to provide the indication of whether the media signal being played back is certified as authentic.

At a query operation 608, the processor 306 then detects the result of the verification. An example of the details of detecting the verification result is shown in FIG. 7 which is discussed below. If it is detected that the signature is not verified, then the processor 306 provides the indicator that the media segment is not certified at an indication operation 610. If it is detected that the signature is verified, then the processor 306 provides the indicator that the media segment is certified at an indication operation 612.

FIG. 7 shows one example of details of the query operation 608 of FIG. 6. In this example, the operations begin at a sub-query operation 702. Here the processor 306 checks to determine whether the resulting media content, which is the media content revealed during the signature verification, matches the media content that is actually present in the media content portion of the media segment. If there is no match, then this indicates that the actual media content has been altered after the certification data was added. Operational flow proceeds to the indicator operation 610. If there is a match, then operational flow proceeds to a next sub-query 704.

In this example, at the next sub-query operation 704, the processor 306 checks to determine whether the resulting signature(s), which is the signature(s) revealed during the signature verification, matches the signatures that are actually present in the metadata of the nearby media segments. If there is no match, then this indicates that some aspect of the nearby media segments have been altered after the certification data was added. Operational flow proceeds to the indicator operation 610. If there is a match, then operational flow proceeds to a next sub-query if there is another and otherwise proceeds to the indicator operation 612. Other sub-queries such as those discussed below may be performed for embodiments where the certification data includes additional information for which the authenticity is of concern.

In this example, at the next sub-query operation 706, the processor 306 checks to determine whether the resulting public key, which is the public key revealed during the signature verification, matches the public key that is actually present in the metadata portion of this or any other media segment. If there is no match, then this may indicate that the public key has been altered after the certification, perhaps in an attempt to generate a new signature for one or more media segments including the current one by using a different public/private key pair. Operational flow proceeds to the indicator operation 610. If there is a match, then operational flow proceeds to a next sub-query if there is another and otherwise proceeds to the indicator operation 612.

In this example, at the next sub-query operation 708, the processor 306 checks to determine whether the resulting geographical coordinates, which are the geographical coordinates revealed during the signature verification, match the geographical coordinates that are actually present in the metadata of the current media segment. If there is no match, then this indicates that the geographical coordinates of the metadata have been altered after the certification data was added. Operational flow proceeds to the indicator operation 610. If there is a match, then operational flow proceeds to a next sub-query if there is another and otherwise proceeds to the indicator operation 612.

In this example, at the next sub-query operation 710, the processor 306 checks to determine whether the resulting time stamp, which is the time stamp revealed during the signature verification, matches the time stamp that is actually present in the metadata of the current media segment. If there is no match, then this indicates that the time stamp of the metadata has been altered after the certification data was added. Operational flow proceeds to the indicator operation 610. If there is a match, then operational flow proceeds to a next sub-query if there is another and otherwise proceeds to the indicator operation 612.

In this example, at the next sub-query operation 712, the processor 306 checks to determine whether the resulting angle/position, which is the angle/position revealed during the signature verification, matches the angle/position that is actually present in the metadata of the current media segment. If there is no match, then this indicates that the angle/position of the metadata has been altered after the certification data was added. Operational flow proceeds to the indicator operation 610. If there is a match, then operational flow proceeds to a next sub-query if there is another. In this example, there is no other and so operational flow proceeds to the indicator operation 612.

While embodiments have been particularly shown and described, it will be understood by those skilled in the art that various other changes in the form and details may be made therein without departing from the spirit and scope of the invention.

What is claimed is:

1. A method, comprising:
obtaining, by a media signal processor, a private key and a public key;
for a first video frame of a media signal, wherein the media signal comprises a plurality of sequential video frames:
creating, by the media signal processor, a first signature to sign the first video frame of the plurality of sequential video frames by combining the private key, the public key, and the first media content data of the first video frame to sign the first video frame;
determining, by the media signal processor, a second signature to sign a second video frame of the plurality of sequential video frames by combining the private key, the public key, the first signature, and second media content data of the second video frame; and
determining subsequent signatures for respective frames of the plurality of sequential video frames by combining the private key, previous signatures, and respective metadata comprising respective media content data of the respective video frame to sign the respective video frame,
wherein the previous signatures comprise signatures of a predetermined number of previous video frames to preceding the respective video frame.

2. The method of claim 1, further comprising:
during playback of the media signal by the media signal processor, obtaining the public key and the first signature from the metadata of the first video frame; and
verifying, by the media signal processor, the first video frame, wherein the verifying comprises:
  applying, by the media signal processor, the public key to the first signature to produce a first resulting signature and a resulting media content;
  applying, by the media signal processor, the public key to the second signature to produce a second resulting signature;
  comparing, by the media signal processor, the second resulting signature to the second signature from the second video frame;
  comparing, by the media signal processor, the first resulting signature to the first signature from the first video frame;
  comparing, by the media signal processor, the resulting media content to the media content of the first video frame;
  generating, by the media signal processor, an indicator that the first video frame is not certified responsive to one of the resulting first signature not matching the first signature obtained from the first video frame, the second resulting signature not matching the second signature obtained from the second video frame, the resulting media content not matching the first media content of the first video frame, or combinations thereof, wherein the indicator that the first video frame is not certified comprises an indication of a specific reason for not certifying; and
  generating, by the media signal processor, an indicator that the first video frame is certified responsive to the first signature being verified.

3. The method of claim 2,
wherein the verifying of the first video frame comprises applying the public key included in the metadata of the first video frame to the first signature of the first video frame to produce a resulting public key and comparing the resulting public key to the public key obtained from the metadata of the first video frame, and generating the indicator that the first video frame is not certified, responsive to the resulting public key not matching the public key obtained from the metadata of the first video frame, such that the first signature is not verified.

4. The method of claim 2, further comprising:
capturing, by the media signal processor, geographical coordinates prior to creating the first signature for the first video frame of the media signal; and
including, by the media signal processor, the geographical coordinates within the metadata of the first video frame,
wherein the creating of the first signature for the first video frame comprises using the private key to sign the first media content data comprising geographical coordinates, and
wherein the verifying of the first signature of the first video frame comprises applying the public key included in the metadata of the media signal to the first signature of the first video frame to produce resulting geographical coordinates and comparing the resulting geographical coordinates to the geographical coordinates obtained from the metadata of the first video frame, and generating the indicator that the video frame is not certified, responsive to the resulting geographical coordinates not matching the geographical coordinates obtained from the metadata of the media signal such that the first signature is not verified.

5. The method of claim 2, further comprising:
capturing, by the media signal processor, a time stamp prior to creating the first signature for the first video frame of the media signal; and
including, by the media signal processor, the time stamp within the metadata of the first video frame,
wherein the creating of the first signature for the first video frame comprises using the private key to sign the first media content data comprising the time stamp, and
wherein the verifying of the first signature of the first video frame comprises applying the public key included in the metadata of the media signal to the first signature of the first video frame to produce a resulting time stamp and comparing the resulting time stamp to the time stamp obtained from the metadata of the first video frame, and generating the indicator that the first video frame is not certified, responsive to the resulting time stamp not matching the time stamp obtained from the metadata of the media signal such that the first signature is not verified.

6. The method of claim 1,
further comprising capturing, by the media signal processor, information about an angle of a media capture device associated with capture of content represented in the first video frame of the media signal, wherein metadata comprises the information about the angle.

7. The method of claim 1,
wherein each of the plurality of sequential video frames comprises a digital content portion and a metadata portion, wherein the metadata portion comprises a respective signature of a respective video frame.

8. The method of claim 1,
wherein each of the plurality of sequential video frames comprises an analog content portion and a metadata portion, wherein the metadata portion comprises a respective signature of a respective video frame.

9. A non-transitory machine-readable storage medium, comprising instructions, wherein responsive to executing the instructions, a processor performs operations comprising:
obtaining a private key and a public key;
for a first video frame of a media signal, wherein the media signal comprises a plurality of sequential frames:
  creating a first signature to sign a first frame of the plurality of sequential frames by combining the private key, the public key, and first media content data of the first frame to sign the first frame, wherein the public key and first signature are included in metadata of the first frame;
  determining a second signature to sign a second frame of the plurality of sequential frames by combining the private key, the first signature, and second media content data of the second frame; and
  determining subsequent signatures for respective frames of the plurality of sequential frames by combining the private key, the public key, previous signatures, and respective media content data of the respective frame to sign the respective frame,
wherein the previous signatures comprise signatures of a predetermined number of previous frames to preceding the respective frame.

10. The non-transitory machine-readable medium of claim 9, wherein
capturing information about an angle of a media capture device associated with capture of content prior to creating the first signature for the first frame of the media signal; and
including the information about the angle within the metadata of the first frame,
wherein creating the first signature for the first frame comprises using the private key to sign the first media content data comprising the information about the angle.

11. The non-transitory machine-readable medium of claim 9, wherein the operations further comprise:
capturing geographical coordinates prior to creating the first signature for the first frame of the media signal; and
including the geographical coordinates within the metadata of the first frame,
wherein creating the first signature for the first frame comprises using the private key to sign the first media content data comprising the geographical coordinates.

12. The non-transitory machine-readable medium of claim 9, wherein the operations further comprise:
capturing a time stamp prior to creating the first signature for the first frame of the media signal; and
including the time stamp within the metadata of the first frame,
wherein creating the first signature for the first frame comprises using the private key to sign the first media content data comprising the time stamp.

13. The non-transitory machine-readable medium of claim 9, wherein the media signal comprises video content.

14. A device, comprising:
a memory to store instructions, a private key and a public key; and
a processor in communication with the memory, wherein the processor, responsive to executing the instructions facilitates performance of operations comprising:
for a first frame of a media signal, wherein the media signal comprises a plurality of sequential video frames:
creating a first signature to sign a first video frame of the plurality of sequential video frames by combining the private key, the public key, and first media content data of the first video frame to sign the first video frame, wherein metadata of the first video frame comprises the public key and the first signature;
creating a second signature to sign a second video frame of the plurality of sequential video frames by combining using the private key, the first signature, and second media content data of the second video frame, wherein metadata of the first video frame comprises the second signature; and
determining subsequent signatures for respective frames of the plurality of sequential video frames by combining the private key, previous signatures, and respective media content data of the respective video frame to sign the respective video frame,
wherein metadata of the sequential frames each comprise a respective subsequent signature, and
wherein the previous signature comprises signatures of a predetermined number of previous video frames preceding the respective video frame.

15. The device of claim 14, wherein the operations further comprise creating the first signature for the first video frame by using the private key to sign the combination of the first media content data that also includes the public key and the second signature.

16. The device of claim 14, wherein the operations further comprise obtaining geographical coordinates captured by a geographical capture component prior to creating the first signature for the first video frame of the media signal, includes the geographical coordinates within the metadata of the first video frame, and creates the first signature for the first video frame by using the private key to sign the combination of the first media content data comprising the geographical coordinates and the second signature.

17. The device of claim 14, wherein the operations further comprise obtaining a time stamp from an atomic clock receiver prior to creating the first signature for the first video frame of the media signal, includes the time stamp within the metadata of the first video frame, and creating the first signature for the video frame by using the private key to sign the combination of the first media content data comprising the time stamp and the second signature.

* * * * *